(12) United States Patent
Lacey, Jr. et al.

(10) Patent No.: US 9,024,188 B2
(45) Date of Patent: May 5, 2015

(54) RACEWAY FOR INSTRUMENTATION LINES

(75) Inventors: Richard C. Lacey, Jr., Orange Beach, AL (US); Patrick D'olive, Montrose, AL (US); Ralph K. Joffrion, Jr., Daphne, AL (US); James A. Roberts, Silver Hill, AL (US)

(73) Assignee: Techline International, Inc., Spanish Fort, AL (US)

( * ) Notice: Subject to any disclaimer, the term of this patent is extended or adjusted under 35 U.S.C. 154(b) by 693 days.

(21) Appl. No.: 13/201,310

(22) PCT Filed: Feb. 17, 2010

(86) PCT No.: PCT/US2010/024418
§ 371 (c)(1),
(2), (4) Date: Aug. 12, 2011

(87) PCT Pub. No.: WO2010/096441
PCT Pub. Date: Aug. 26, 2010

(65) Prior Publication Data
US 2011/0290523 A1    Dec. 1, 2011

Related U.S. Application Data

(60) Provisional application No. 61/207,764, filed on Feb. 17, 2009.

(51) Int. Cl.
*H02G 3/04* (2006.01)
*H01R 4/00* (2006.01)
(Continued)

(52) U.S. Cl.
CPC ........... *H02G 3/0608* (2013.01); *H02G 3/0437* (2013.01)

(58) Field of Classification Search
CPC .... H01R 25/14; H01R 25/145; H02G 3/0418; H02G 3/0608
USPC ....... 174/68.1, 68.3, 72 R, 656, 662; 361/826
See application file for complete search history.

(56) References Cited

U.S. PATENT DOCUMENTS 1,590,569 A * 6/1926 Fisk ............................... 248/323
2,360,159 A * 10/1944 Peck ............................. 285/371
(Continued)

FOREIGN PATENT DOCUMENTS

CN    2362216 Y    2/2000
CN    2785217 Y    5/2006

OTHER PUBLICATIONS

International Search Report and Written Opinion, PCT/US2010/024418 Dated Apr. 28, 2010.

*Primary Examiner* — Chau N Nguyen
*Assistant Examiner* — Roshn Varghese
(74) *Attorney, Agent, or Firm* — Lerner, David, Littenberg, Krumholz & Mentlik, LLP

(57) ABSTRACT

A kit for forming a raceway assembly including a plurality of members can include a plurality of portions including channel portions and coupling portions, each of the portions extending in an axial direction and having a plurality of walls defining a generally U-shaped cross-section. Each channel portion may have at least one opening in at least one wall, and each of the coupling portions has at least one hole in at least one wall. Each coupling portion may be adapted to receive one or more of the channel portions so that axial directions of the received channel portions are aligned with the axial direction of the coupling portion and so that at least one of the openings of each received channel portion is aligned with at least one of the holes. The coupling portions and channel portions may have inter-engageable features which preclude movement of the received channel portions relative to the coupling portion other than in the axial directions thereof. In addition, the kit may include one or more non-threaded pins configured to pass through the aligned holes and openings and lock in place.

17 Claims, 17 Drawing Sheets

(51) Int. Cl.
*H01R 4/50* (2006.01)
*H02G 15/08* (2006.01)
*H02B 1/20* (2006.01)
*H02G 3/06* (2006.01)

(56) References Cited

U.S. PATENT DOCUMENTS

| | | | |
|---|---|---|---|
| 3,053,358 A * | 9/1962 | Gross | 248/49 |
| 3,671,062 A * | 6/1972 | Ashworth | 403/292 |
| 3,770,875 A | 11/1973 | Carlson | |
| 3,900,269 A * | 8/1975 | Pavlot | 403/292 |
| 4,305,677 A * | 12/1981 | Kowalski | 403/295 |
| 5,271,585 A | 12/1993 | Zetena, Jr. | |
| 6,143,984 A * | 11/2000 | Auteri | 174/68.3 |
| 6,235,988 B1 | 5/2001 | Karst et al. | |
| 6,399,883 B1 | 6/2002 | Lhota | |
| 6,872,039 B2 | 3/2005 | Baus et al. | |
| 6,879,490 B2 * | 4/2005 | Mattei et al. | 361/727 |
| 6,972,367 B2 | 12/2005 | Federspiel et al. | |
| 7,262,370 B1 | 8/2007 | Gretz | |
| 7,576,283 B2 * | 8/2009 | Kadrnoska et al. | 174/21 JS |
| 2002/0158169 A1* | 10/2002 | Benito-Navazo | 248/49 |
| 2004/0003935 A1* | 1/2004 | Colmart et al. | 174/48 |
| 2004/0218992 A1 | 11/2004 | Baus et al. | |

* cited by examiner

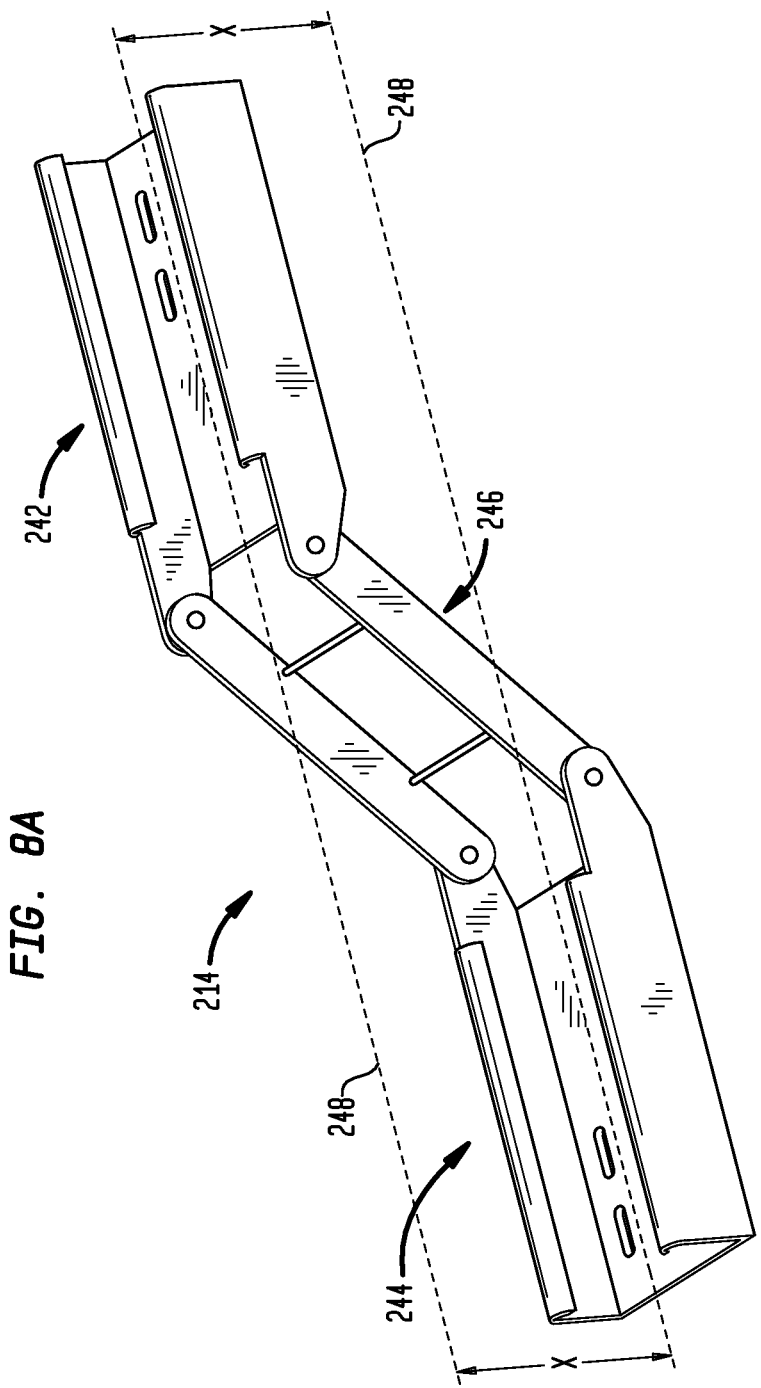

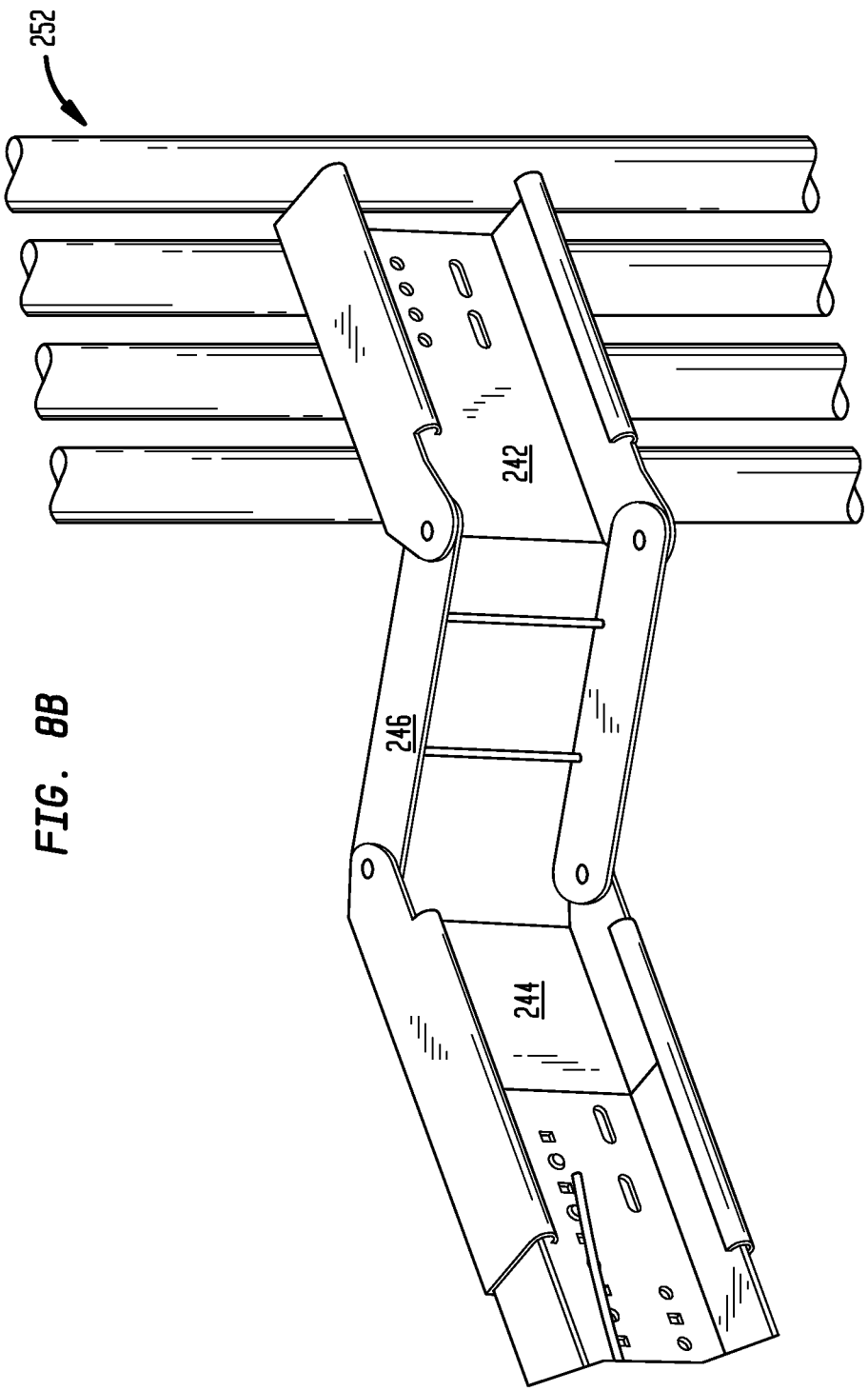

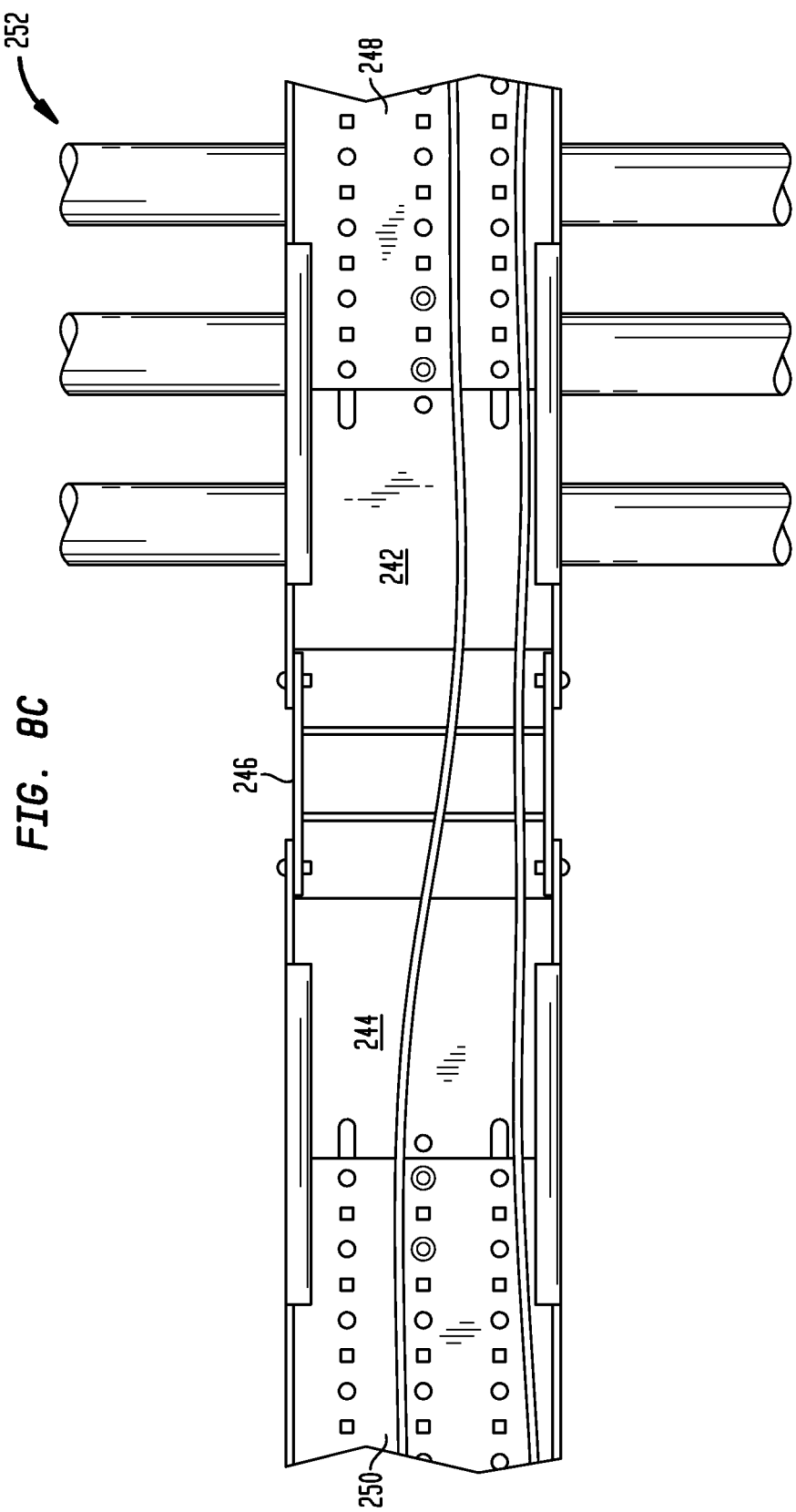

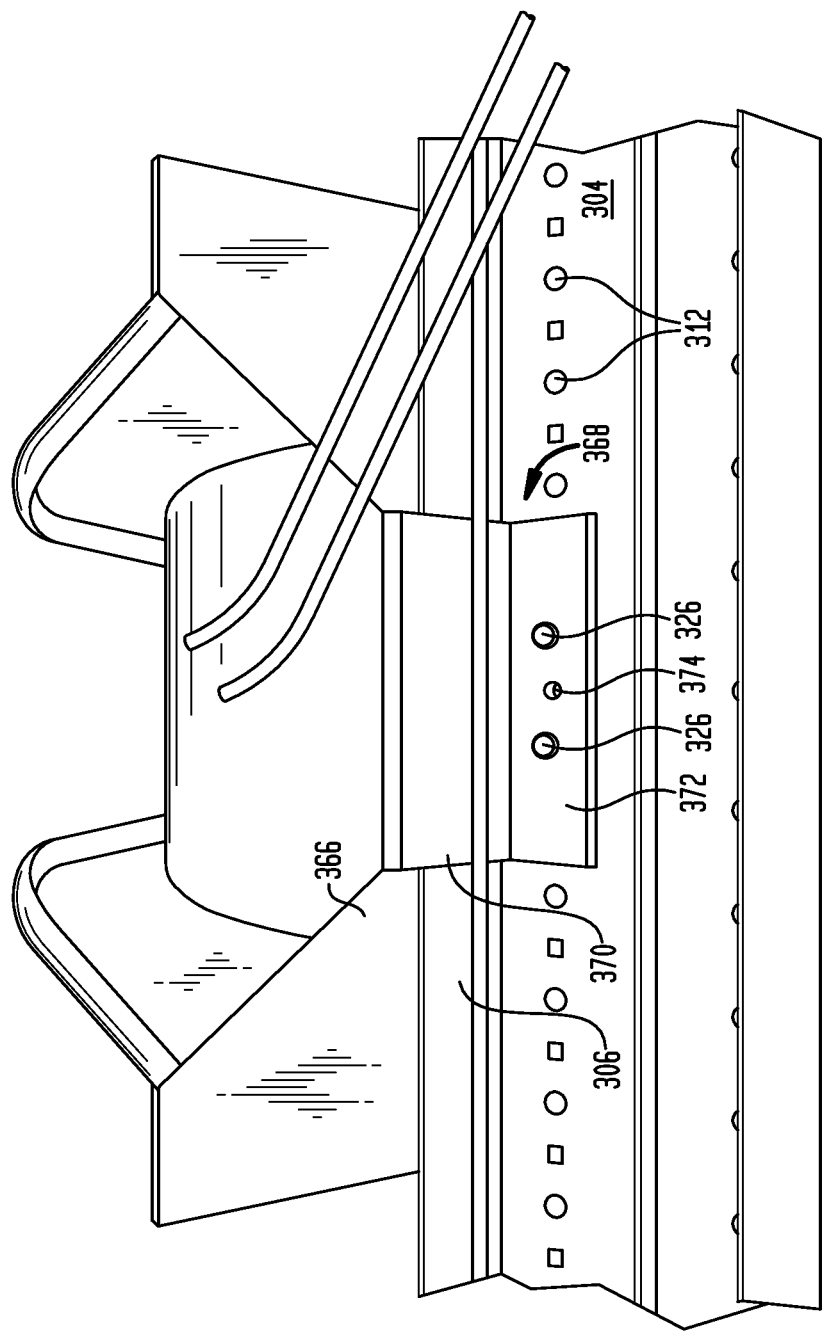

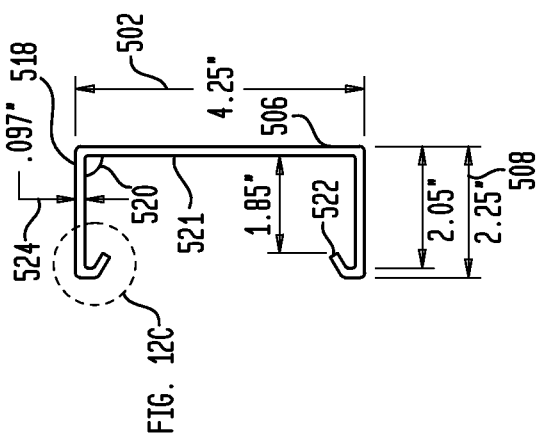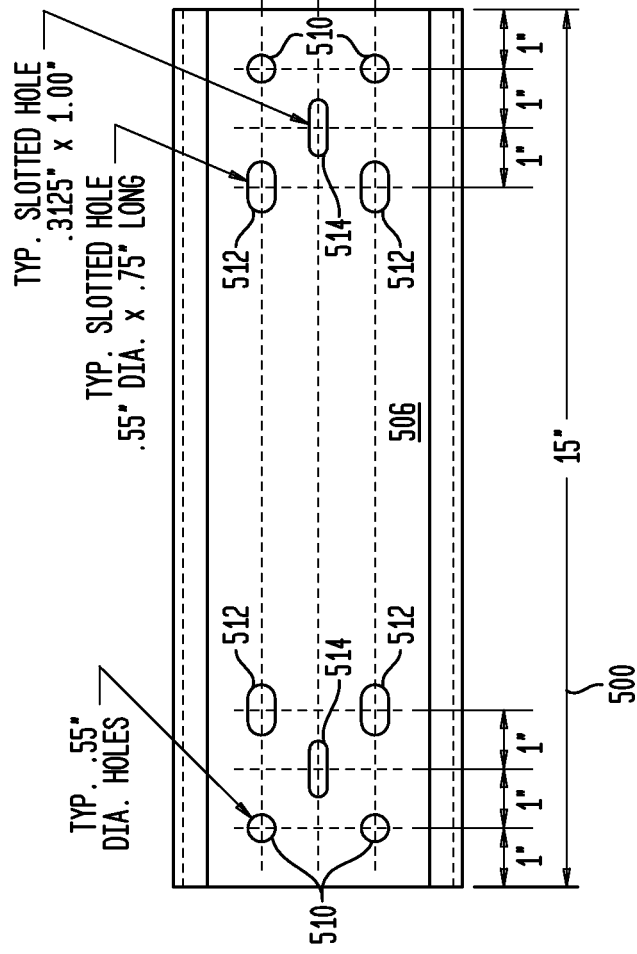

RACEWAY FOR INSTRUMENTATION LINES

CROSS REFERENCE TO RELATED APPLICATIONS

The present application is a national phase entry under 35 U.S.C. §371 of International Application No. PCT/US2010/024418 filed Feb. 17 2010, designating the United States. Said international application claims the benefit of the filing date of U.S. Provisional Patent Application No. 61/207,764 filed Feb. 17, 2009. The disclosures of the aforesaid applications are hereby incorporated by reference herein.

FIELD OF THE INVENTION

The present invention relates to a raceway assembly for instrumentation lines. More particularly, the present invention relates to a raceway assembly made up of channels and couplings connected by pins, which system can be assembled without tools.

BACKGROUND OF THE INVENTION

Raceways are used to route cables or other wires or instrumentation lines along surfaces such as walls, floors, ceilings, or on other fixed structures. Raceways provide a convenient way to eliminate the dangers associated with exposed lines and manage instrumentation lines while keeping the lines contained and often out of sight.

Many current raceway designs are made of multiple components, including straight channel sections connected by couplings. These components are connected together using a variety of methods including, for example, nuts and bolts and/or adhesives. While such methods may serve their intended purpose to connect the components of the raceway together, they often increase the cost, labor, and time of installing or removing raceway systems. This is because installation, removal, and repair of such systems often require the employment of tools such as wrenches or materials such as adhesive. This added burden may be excessive, particularly in large scale applications such as, for example, raceways for carrying instrumentation lines or cables at an oil refinery. In such applications, raceways may be difficult to access, and any down time of instrumentation while a raceway is being repaired may be extremely costly.

Accordingly, there is a need in the art for further improvements.

SUMMARY OF THE INVENTION

One aspect of the present invention provides a kit for forming a raceway assembly including a plurality of members defining a plurality of portions including channel portions and coupling portions. Each the portions can extend in an axial direction and have a plurality of walls defining a generally U-shaped cross-section. Each said channel portion may have at least one opening in at least one wall. Each said coupling portion may have at least one hole in at least one wall. Each said coupling portion may be adapted to receive one or more of the channel portions so that axial directions of the received channel portions are aligned with the axial direction of the coupling portion. In addition, at least one of the openings of each received channel portion can be aligned with at least one of the holes. The coupling portions and channel portions can have inter-engageable features which preclude movement of the received channel portions relative to the coupling portion other than in the axial directions thereof. The kit can further include one or more non-threaded pins configured to pass through the aligned holes and openings and lock in place.

In a preferred embodiment, the walls of each said channel portion of the kit can include a base wall and a pair of lateral walls extending upwardly from the base wall. Each such lateral wall can have an upper edge remote from the bottom surface. The walls of each said coupling portion can include a bottom wall and a pair of side walls extending upwardly from the bottom wall, and each such side wall can have an upper edge and a lip projecting from such upper edge in an inward direction toward the other side wall of the coupling portion and downwardly toward the bottom wall of the coupling portion. Each coupling portion can be adapted to receive the one or more channel portions so that the edge of each lateral wall of each received channel portion is engaged between a side wall of the coupling portion and the lip projecting from such side wall.

Furthermore, the members may include at least one curved member curved in a direction transverse to the axial direction of the portion defined by the curved member. A member may include at least one hinge member, first and second portions, and a hinge connecting the first and second portions, wherein the first and second portions of the hinge member are coupling portions.

The pins of one embodiment of the invention may include a body having a head, a bore intersecting the body, and a plunger. The plunger may be slidably disposed within the bore and configured to oscillate between an inward position wherein the plunger is contained within the surface of the body and an outward position wherein the plunger extends beyond the surface of the body. Furthermore, when the plunger is in its inward position the pin can pass through the opening in the wall of the channel portion and the hole in the wall of the coupling portion. When the pin is in its outward position the pin is locked in place. Additionally, another embodiment may include a bracket adapted to attach one or more of the members to a structure.

Another aspect of the present invention provides a method for forming a raceway assembly. Such method can include providing a plurality of members defining a plurality of portions including a plurality of channel portions and a coupling portion. Each of the portions can extend in an axial direction and have a plurality of walls defining a generally U-shaped cross-section. Each said channel portion can have at least one opening in at least one wall. Each said coupling portion can have at least one hole in at least one wall.

The method can include receiving one or more of the channel portions by the coupling portion so that axial direction of each received channel portion is aligned with the axial direction of the coupling portion. At least one of the openings of each received channel portion can be aligned with at least one of the holes. The coupling portion and each received channel portion can have inter-engageable features which preclude movement of the received channel portion relative to the coupling portion other than in the axial directions thereof. The method can include passing one or more non-threaded pins through the aligned holes and openings to lock at least one received channel portion in place with the coupling portion.

In a preferred embodiment, the walls of each said channel portion can include a base wall and a pair of lateral walls extending upwardly from the base wall. Each such lateral wall can have an upper edge remote from the bottom surface. The walls of the coupling portion can include a bottom wall and a pair of side walls extending upwardly from the bottom wall. Each such side wall can have an upper edge and a lip projecting from such upper edge in an inward direction toward the other side wall of the coupling portion and downwardly toward the bottom wall of the coupling portion. The coupling portion can receive the one or more channel portions so that the edge of each lateral wall of each received channel portion is engaged between a side wall of the coupling portion and the lip projecting from such side wall.

BRIEF DESCRIPTION OF THE DRAWINGS

The present technology will be better understood on reading the following detailed description of nonlimiting embodiments thereof, and on examining the accompanying drawings, in which:

FIG. 8A is a perspective view of another embodiment of a coupler of the present technology;

FIG. 8B is another perspective view of the embodiment of the coupler of FIG. 8A;

FIG. 8C is a top view of the embodiment of the coupler of FIG. 8A;

FIG. 9C is yet another perspective view of the coupler of FIG. 9A;

FIG. 12A is a plan view depicting a coupler according to a preferred embodiment of the present technology.

FIG. 12B is a sectional view depicting the coupler illustrated in FIG. 12A.

FIG. 12C is a detail partial sectional view corresponding to the sectional view of FIG. 12B.

DETAILED DESCRIPTION

Figure 1:
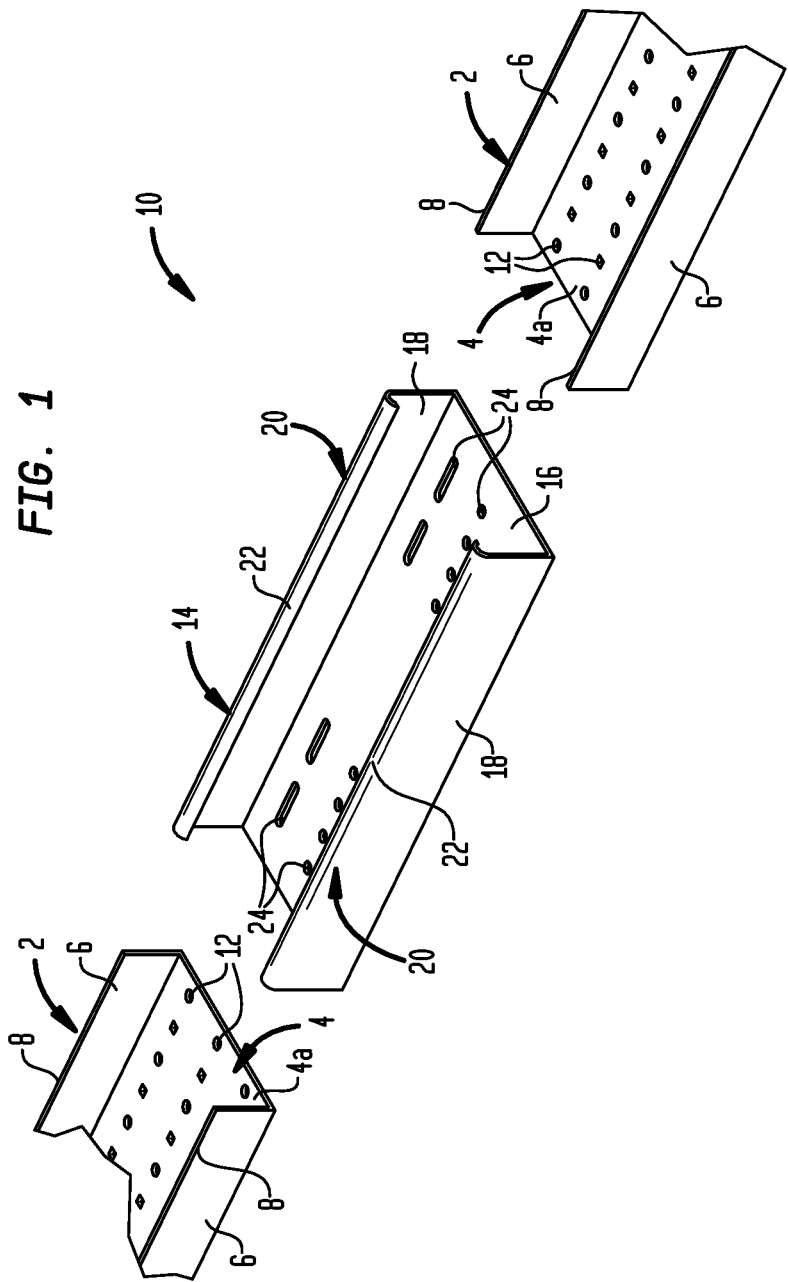
FIG. 1 is an exploded perspective view of the raceway assembly according to an embodiment of the present technology.

Referring now to the drawings wherein like reference numerals indicate similar features, FIG. 1 shows an exemplary embodiment of a raceway assembly according to an embodiment of the present technology. Raceway assembly 10 includes channel portions 2 that extend in an axial direction and have a U-shaped cross-section. Each channel portion 2 may include a base wall 4, with a pair of lateral sidewalls 6 extending from the base wall 4. The base wall 4 includes an inner surface 4a facing inwardly with respect to channel portion 2 and an outside surface 4b (shown in FIG. 5) facing outwardly with respect to channel portion 2. Each lateral sidewall 6 has an upper edge 8 positioned remote from the base wall 4. Each channel portion 2 has at least one opening 12 in at least one of the base wall 4 or a lateral sidewall 6. In the embodiment shown in FIG. 1, multiple openings 12 are located in base wall 4, although it is to be understood that there may be a single opening or a plurality of openings. Furthermore, openings 12 may be located in the base wall 4 or in lateral side walls 6 or both.

Also shown in FIG. 1 is a coupling portion 14. The coupling portion extends in an axial direction and has a U-shaped cross section. Coupling portion 14 may include a bottom wall 16 and a pair of sidewalls 18. The bottom wall 16 includes an inner surface 16a facing inwardly with respect to coupling portion 14 and an outside surface 16b (shown in FIG. 5) facing outwardly with respect to coupling portion 14. Sidewalls 18 extend upwardly from bottom wall 16 and have an upper edge 20 remote from the bottom wall 16. The coupling portion 14 may further include a lip 22 extending from the upper end 20 of each sidewall 18. Each lip 22 may extend inwardly in a direction toward the opposite sidewall 18. The lip may extend downwardly toward the bottom wall 16. In addition, the lip 22 may be radiused or it may not be radiused. Each coupling portion 14 includes at least one hole in at least one wall thereof. The coupling portion 14 shown in FIG. 1 provides multiple holes 24 in the bottom wall 16 thereof. It is to be understood, however, that there may be a single hole or a plurality of holes. Furthermore, holes 12 may be located in the bottom wall 16 or in sidewalls 18 or both. The channel and coupling portions of the raceway assembly may be constructed of, for example, metal, such as aluminum, polymeric materials, or a combination of metal and polymeric materials. The materials may be reinforced or non-reinforced. In addition, the channel and coupling portions may be made of the same materials or different materials.

Figure 2:
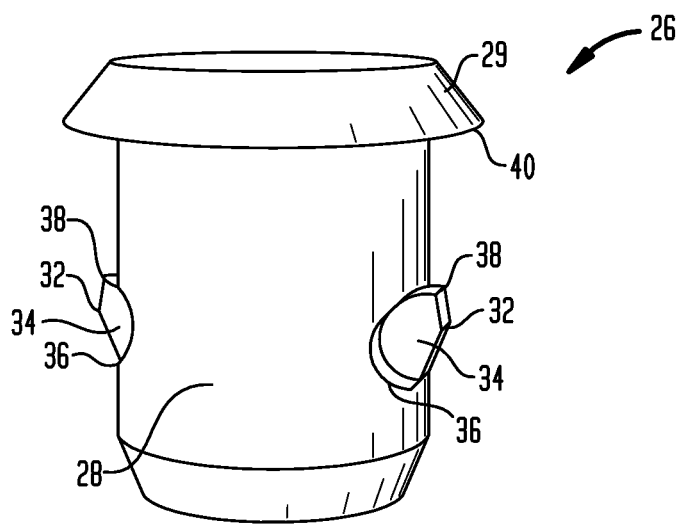
FIG. 2 is a perspective view of a pin in accordance with the present technology.

There is shown in FIG. 2 a pin 26 according to an embodiment of the present technology. The pin includes a body 28 with a head 29. The body 28 has a bore (not shown) formed therein, and at least one plunger 32. The plunger 32 is slideably disposed within the bore of the body of the pin. The position of the plunger 32 with respect to the bore may be maintained by a biasing mechanism (not shown), such as a spring, disposed within the bore. In its unbiased position, plunger 32 may be maintained partially inside and partially outside the bore. The portion of plunger 32 outside the bore may be wedge shaped, having an angled surface 34 that tapers outwardly from generally flush with the surface of the body at a bottom end 36 thereof to an extended tip 38. When force is applied to the angled surface 34 of the plunger, the plunger may retract into the bore. Conversely, when the force is removed, the wedge portion of the plunger 32 will reemerge from the bore 32 as directed by the biasing mechanism. The pin may be composed of any suitable material, such as, for example, aluminum. An example of a suitable pin is disclosed in U.S. Pat. No. 6,872,039, the disclosure of which is hereby incorporated herein by reference.

Figure 3:
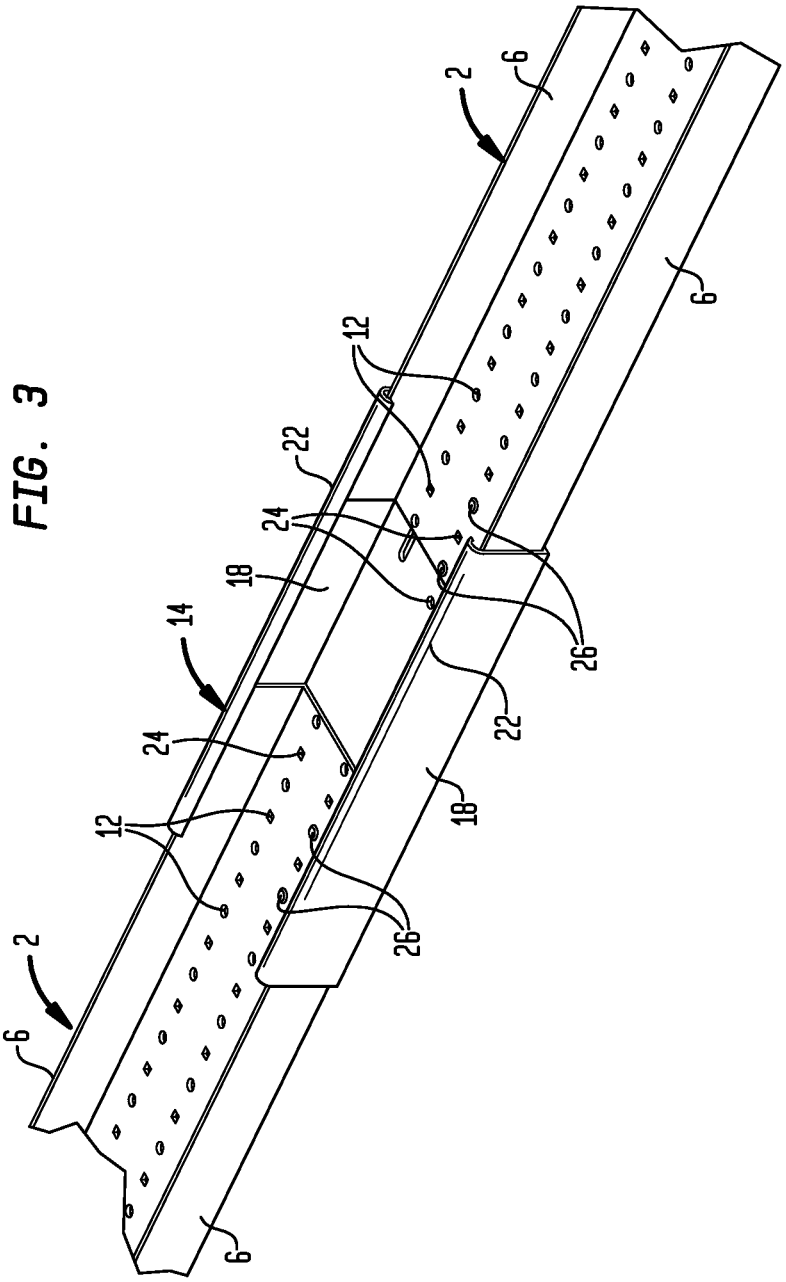
FIG. 3 is a perspective view of the raceway assembly according to an embodiment of the present technology.

Referring now to FIG. 3, there is shown a raceway assembly including channel portions 2, a coupling portion 14, and pins 26 in an assembled state. As can be seen, the walls of coupling portion 14 are configured to receive the walls of channel portions 2. Each lateral wall 6 of the channel portions 2 is engaged between a side wall 18 of the coupling portion 14 and the lip 22 projecting therefrom. In this configuration, the channel portions 2 are restrained from moving relative to the coupling portion 14 except in a direction parallel to the longitudinal axes of the channel portions 2 and the coupling portion 14. Furthermore, the openings 12 in channel portion 2 may be aligned with the holes 24 in coupling portion 14 in order to allow insertion of pins 26 therein.

Figure 4:
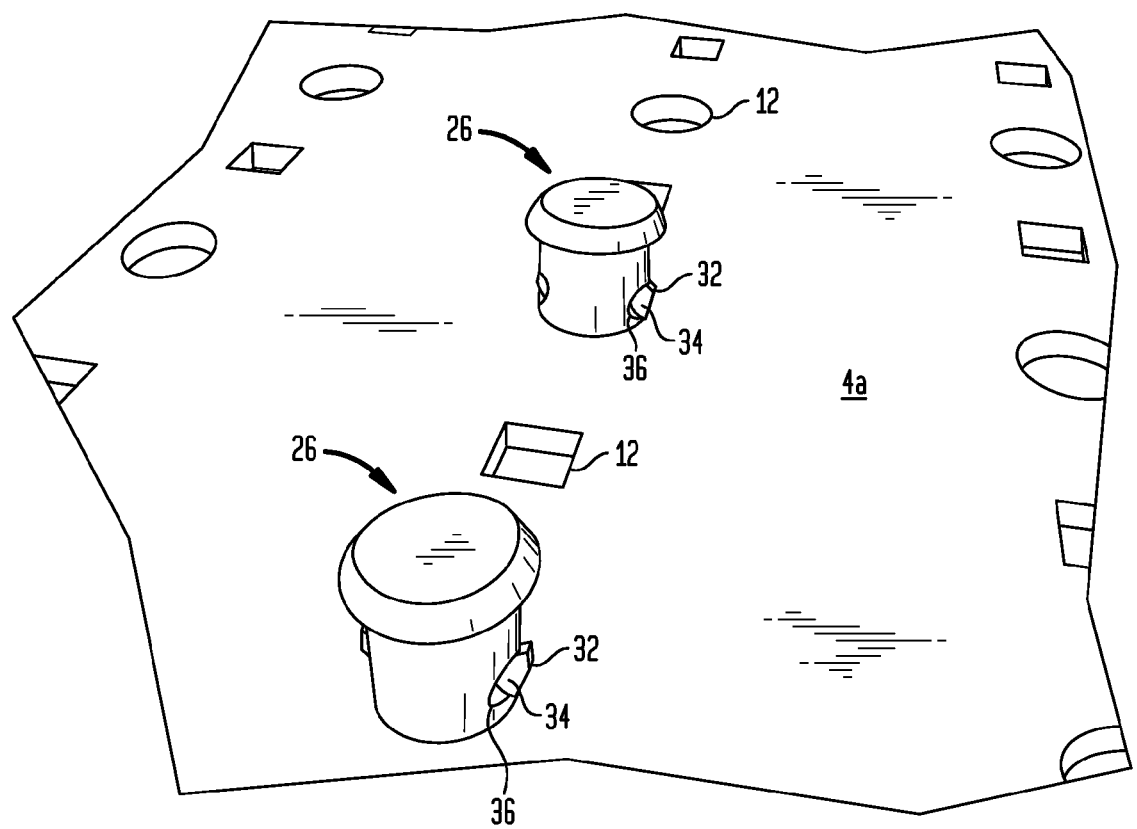
FIG. 4 is a perspective view of the pin of FIG. 2 partially installed in an opening of a channel and/or hole of a coupling of the present technology.

Referring to FIG. 4, there are shown pins 26 as they are partially inserted through openings 12 of channel portion 2 and holes 24 of coupling portion 14. Pins 26 are shown partially inserted into openings 12 with wedge portions of plunger 32 positioned above the inner surface 4a of the base wall of a channel portion. As the pins 26 are inserted, angled surfaces 34 of the wedge portions of plungers 32 contact the edge of openings 12 at the bottom ends 36 thereof. As the pins 26 are pushed into openings 12, the edges of the openings exert an inward force on the angled surfaces 34 of the plungers, which force pushes the plungers 32 into the bores. Thus plungers 32 retract within the bores, thereby allowing pins 26 to pass through openings 12 and holes 24 of the channel and coupling portions.

Figure 5:
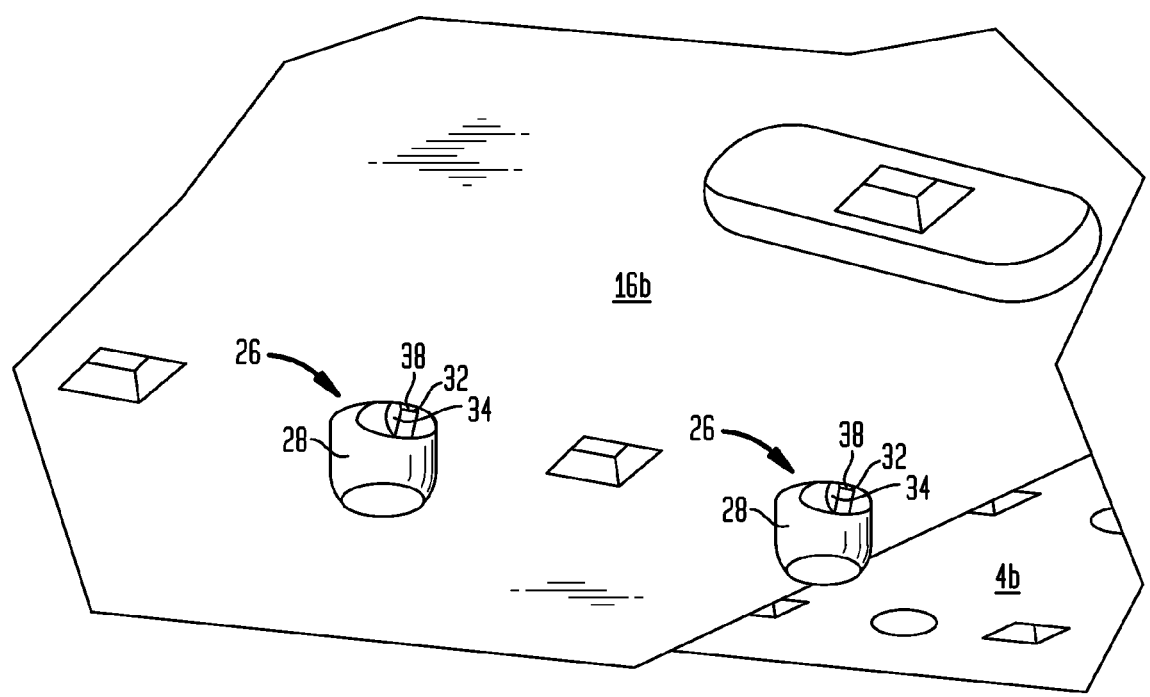
FIG. 5 is a bottom perspective view of the pin of FIG. 2 fully installed in an opening of a channel and/or hole of a coupling of the present technology.
Figure 6:
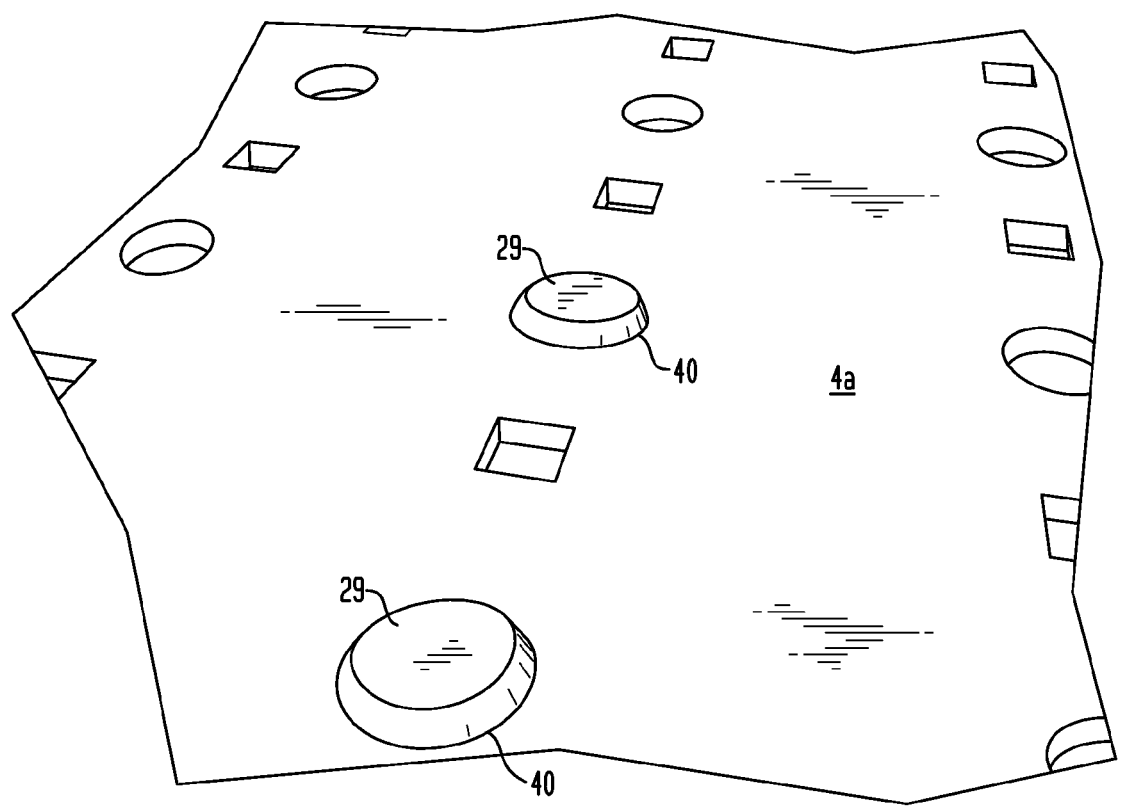
FIG. 6 is a top perspective view of the pin of FIG. 2 fully installed in an opening of a channel and/or hole of a coupling of the present technology.

FIG. 5 shows the outer surfaces 4b and 16b of the channel and coupling portions of the raceway assembly according the pin can pass through the opening in the wall of the channel section and the hole in the wall of the coupling, and to an embodiment of the present technology. In this view, portions of pins 26 can be seen after the pins have been inserted through the openings in the channel portions and the holes in the coupling portion. As the plungers 32 pass beyond the openings and holes as described above with regard to FIG. 4, the edges of the openings and holes are no longer positioned to apply an inward force against the angled surface 34 of the wedge portions of plungers 32. Thus, the biasing mechanism within the bores pushes the plungers 32 outward beyond the surfaces of the body 28. The pins 26 are then configured with the extended tips 38 of the wedge portions of the plungers proximate the outer surface 16b of the bottom wall of the coupling portion. Thus, the pins are locked in the holes and movement in a direction toward the interior of the channel portions of the assembly is precluded. Furthermore, as shown in FIG. 6, with the pins 26 fully inserted into the openings and holes of the channel and coupling portions of the assembly, the undersurface 40 of heads 29 (see also FIG. 2) abut the inner surface 4a of base wall 4, thereby preventing further movement of the pins 26 into the openings in a direction away from the interior of the channel portions of the assembly. Thus, insertion of the pins through the holes and openings blocks axial movement of the channel portions relative to the coupling portions. Although FIGS. 4 and 5 show the pins 26 as passing through the channel and coupling portions in a direction from the inside of the channel toward the outside of the channel, it is to be understood that the pins may be passed through the holes in the opposite direction as well. That is, the pins pass may pass through the channel and coupling from the outside of the channel toward the inside of the channel.

Figure 7:
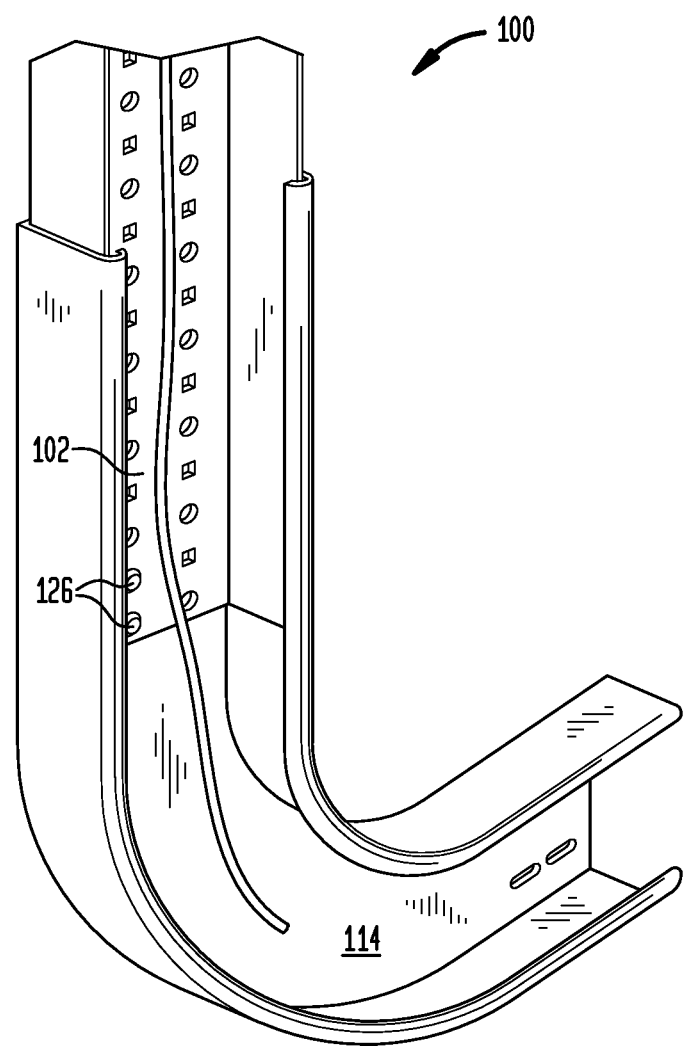
FIG. 7 is a perspective view of an assembly according to another embodiment of the present technology.

Although the raceway assembly described above represents one embodiment of the present technology, the scope of the invention includes many additional embodiments as well. For example, FIG. 7 shows a raceway assembly 100 having at least one channel portion 102, a coupling portion 114, and one or more pins 126. As shown in FIG. 7, the coupling portion 114 may be curved in a direction generally transverse to the axial direction of the channel portion 102, thus forming an elbow or other similar shape. Furthermore, although FIG. 7 shows a coupling portion 114 shaped in the form of an elbow, it is to be understand that this embodiment of the invention is merely illustrative and the coupling portion could form any shape, such as, for example, a T-shape.

Figure 8D:
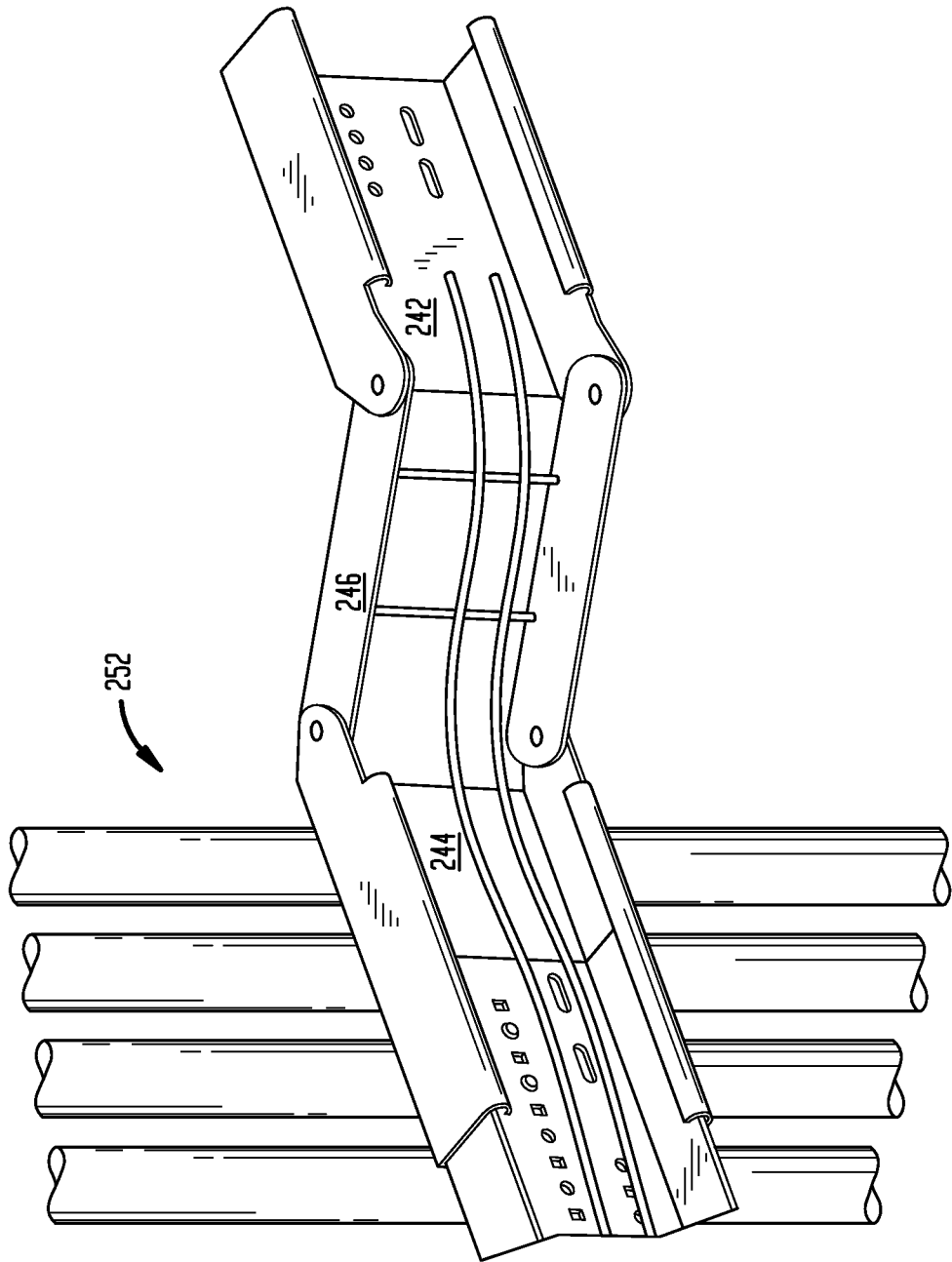
FIG. 8D is an alternative perspective view of the embodiment of the coupler of FIG. 8A.

A further embodiment of the raceway assembly of the present technology is shown in FIGS. 8a-8d. FIG. 8a shows a coupling portion 214 that includes a first coupling element 242, a second coupling element 244, and a hinge portion 246 connecting the first and second coupling elements. Coupling portion 214 serves to connect two channel portions 248, 250 (shown in FIG. 8c) having parallel longitudinal axes separated by a distance X. Such a configuration may allow navigation of the raceway assembly around obstacles that might otherwise create a barrier to its continuity. For example, as shown in FIGS. 8b-8d, coupling portion 214 may allow the raceway assembly to circumvent cables or instrumentation lines 252 in the path thereof.

Figure 9A:
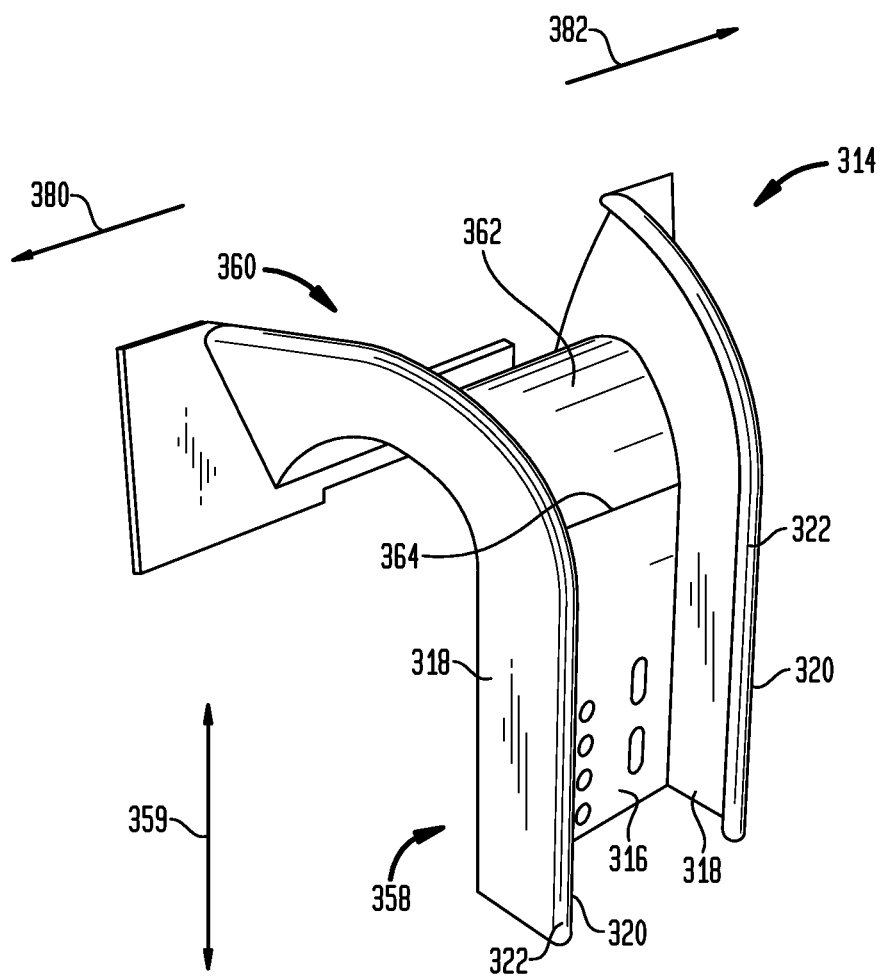
FIG. 9A is a perspective view of an alternative embodiment of a coupler of the present technology.
Figure 9B:
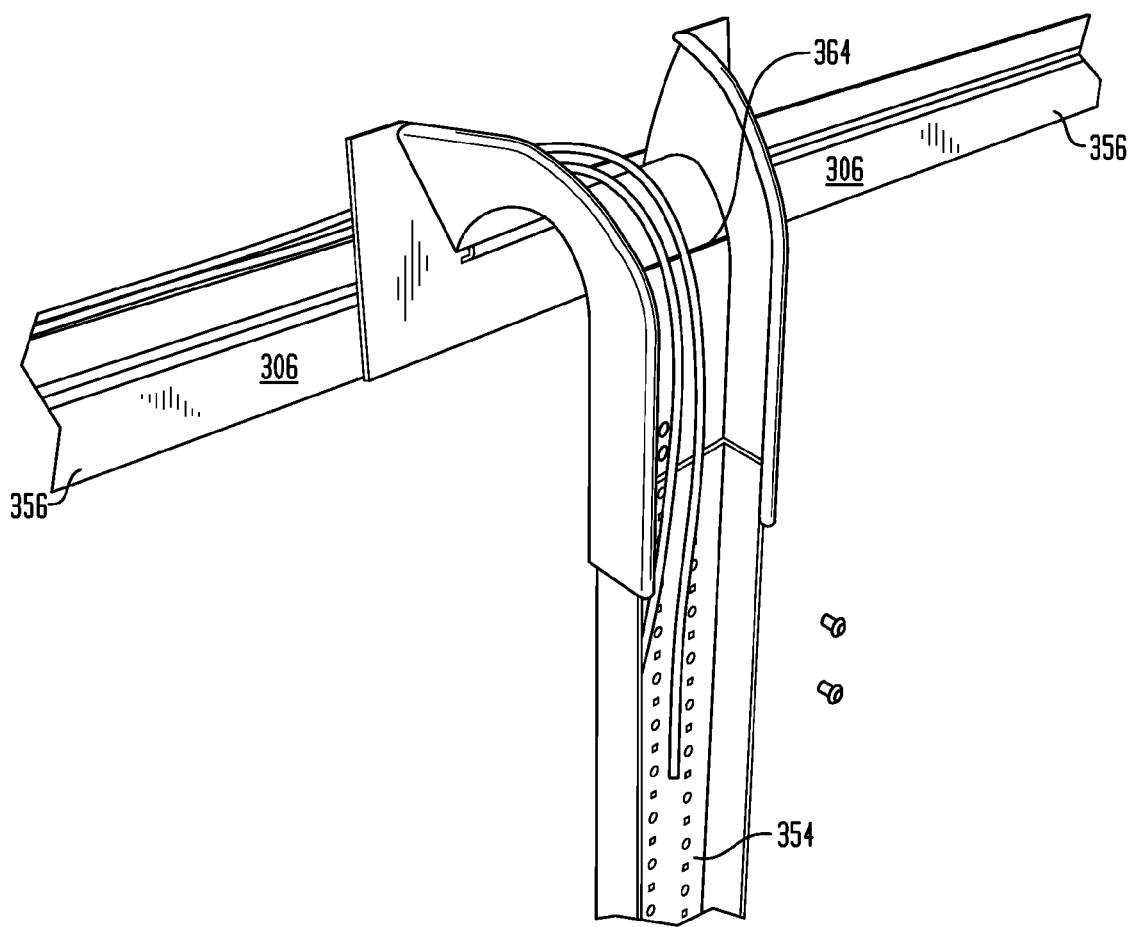
FIG. 9B is another perspective view of the coupler of FIG. 9A.

Referring now to FIGS. 9a-9c, there is shown yet another embodiment of the present technology including coupling portion 314 for connecting a first channel portion 354 (shown in FIG. 9b) to the side of a second channel portion 356, thereby creating a T-junction. As shown in FIG. 9a, coupling portion 314 may have a first end 358 and a second end 360. First end 358 may be configured having a base wall 316 with two side walls 318 extending outwardly therefrom. Each side wall may have an upper edge 320 and a lip 322. The lip may project from the upper edge 320 in an inward and downward direction toward the other sidewall 318 and base wall 316 of the coupling portion.

Second end 360 may curve generally in a direction transverse to the longitudinal axis 359 of the first end of the coupling portion. Accordingly, the base wall 316 may have a curved section 362 configured to bridge the offset between the longitudinal axis 359 of the first end 358 of the coupling portion 314 and the lateral wall 306 of second channel portion 356 (shown in FIG. 9b). The base wall 362 may begin to curve at a point of transition 364 between the first end 358 and the second end 360 of the coupling portion. The lateral walls 318 at the second end 360 of the coupling portion may curve along with base wall 362 and may simultaneously taper outwardly in respective directions 380, 382 from the point of transition 364 to the point of engagement 366 (see FIG. 9c) with the second channel portion 356.

As shown in FIG. 9c, coupling portion 314 may further include a fastening mechanism 368. Fastening mechanism 368 may have a lateral portion 370 and a base portion 372 having holes 374 therethrough. Lateral portion 370 is configured to engage the inside of a lateral side wall 306 of second channel 356 and base portion 372 is configured to engage base wall 304 of second channel 356. In addition, holes 374 of fastening mechanism 368 may be configured to align with openings 312 in the base wall 304 of the second channel 356. Pins 326 may be inserted through holes 374 and openings 312 to lock coupling portion 314 in place relative to the second channel 356.

Figure 10:
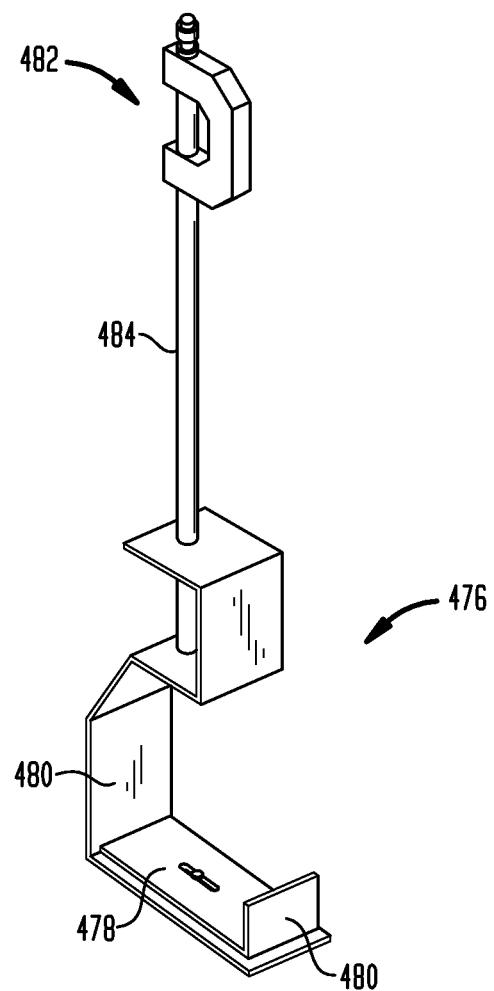
FIG. 10 is a perspective view of a bracket configured to support a raceway assembly according to an embodiment of the present technology.
Figure 11:
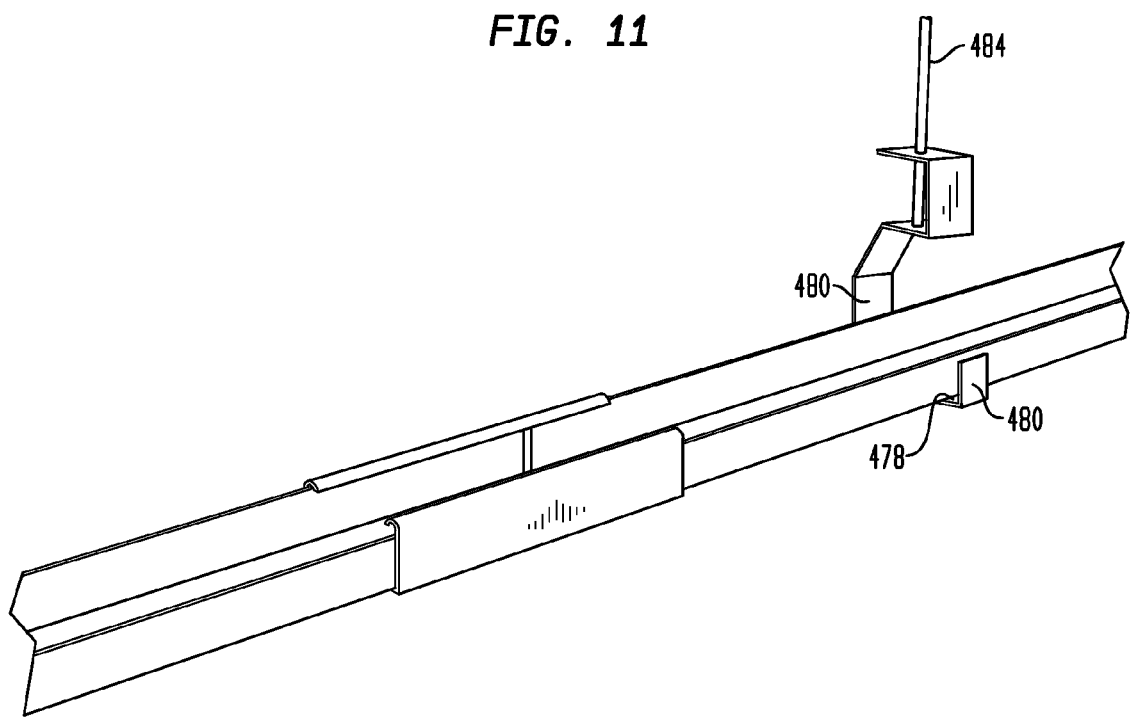
FIG. 11 is an alternative perspective view of the bracket of FIG. 10 having a raceway assembly disposed therein.

Referring now to FIG. 10, there is shown a bracket 476 for attaching the raceway assembly of the present technology to a structure. The bracket 476 includes a base support 478 and two lateral supports 480. In addition, the bracket 476 includes a structure engagement portion 482 attached to the lateral and base supports via an attachment mechanism 484. In use, bracket 476 is configured to engage the base and side walls of a channel or coupling portion of the present technology. Specifically, as shown in FIG. 11, base support 478 is configured to engage a base wall or bottom wall of a channel or coupling portion. Similarly, wall supports 480 are configured to engage side walls of a channel or coupling portion.

A coupling portion according to a particular embodiment can have a structure as depicted in FIGS. 12A-C. As seen therein, the coupling portion can have a length 500 of 15 inches in axial directions of the coupling portion. A width 502 of the coupling portion in a plane of a bottom wall 506 of the coupling portion can be 4.25 inches. A maximum height 508 of the coupling portion measured from a bottom surface of the bottom wall 506 can be 2.25 inches. As seen in FIG. 12A, the bottom wall 506 can have a plurality of holes 510, 512, and 514 having different shapes and positions therein. Further details including the positions of and diameters of round holes 510, and diameters and lengths of slotted holes 512, and 514 are depicted in FIG. 12A.

The sectional view of FIG. 12B further illustrates a construction of the coupling portion in accordance with one embodiment. As seen therein, side walls 518 can extend away from the bottom wall 506 at angles 520. In one example, the angles can be right angles. A thickness 524 of the side walls can be 0.097 inches. In one embodiment, the bottom wall and the lip can have the same thickness 524.

The edge of the lip 522 of the coupling portion can be a height of 1.85 inches above an inner surface 521 of the bottom wall 506. As further seen in FIG. 12C, the lip may extend a distance of 0.180 inches inwardly from an inner surface 528 of the side wall 518. The lip may then curve downwardly toward the bottom wall 506. In one embodiment, the dimension of the downwardly-curving portion of the lip in the direction towards the bottom wall 506 can be 0.25 inches.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A kit for forming a raceway assembly comprising:
a plurality of members defining a plurality of portions including channel portions and coupling portions, each of the portions extending in an axial direction and having a plurality of walls defining a generally U-shaped cross-section, each said coupling portion having a bottom wall and first and second opposing sidewalls extending upwardly from the bottom wall, and each said channel portion having a base wall and a pair of lateral sidewalls extending upwardly from the base wall, the bottom wall of each said coupling portion having a plurality of holes at first intervals extending along a line in the axial direction, and the base wall of each said channel portion having a plurality of corresponding openings at the first intervals extending along a corresponding line in the axial direction, wherein each said coupling portion is adapted to receive one or more of the channel portions so that axial directions of the received channel portions are aligned with the axial direction of the coupling portion and so that a plurality of the openings of each received channel portion is aligned with a plurality of the holes, the coupling portions and channel portions having inter-engageable features which preclude movement of the received channel portions relative to the coupling portion other than in the axial directions thereof, the inter-engageable features comprising first and second lips formed integrally with the first and second sidewalls, respectively, each lip projecting inwardly from such side wall and then projecting downwardly toward the bottom of the coupling portion and inwardly towards the side wall of the coupling portion opposite from such side wall, so that edges of the first and second lateral sidewalls of each received channel portion are engaged between the first and second sidewalls of the coupling portion and the lips projecting from such sidewalls;
the members including at least one hinge member, the hinge member including first and second portions and a hinge, the hinge connecting the first and second portions; and
a plurality of non-threaded pins configured to pass through the aligned holes and openings and lock in place, each pin having a plunger slidably disposed within a bore of the pin, wherein when the plunger is in its inward position the pin can pass through the opening in the wall of the channel portion and the hole in the wall of the coupling portion, and when the plunger is in its outward position the pin is locked in place.

2. A kit as claimed in claim 1, wherein the members include at least one curved member curved in a direction transverse to the axial direction of the portion defined by the curved member.

3. A kit as claimed in claim 1, wherein the first and second portions of the hinge member are coupling portions.

4. A kit as claimed in claim 1, wherein each of the pins includes:
a body having a head;
wherein the bore intersects the body; and
the plunger is configured to oscillate between the inward position wherein the plunger is contained within the surface of the body and the outward position wherein the plunger extends beyond the surface of the body.

5. A kit as claimed in claim 1, further comprising a bracket adapted to attach one or more of the members to a structure.

6. The kit as claimed in claim 1, wherein each lip has a first portion projecting inwardly from one of the first and second side walls of the coupling portion towards the one of the first and second side walls opposite thereto, and a second portion projecting away from the first portion at a location spaced from the one of the first and second side walls, the second portion projecting downwardly and inwardly away from the first portion to define a lateral distance between each lip and the sidewall from which such lip projects, wherein the lateral distance widens in a direction towards a maximum extension of such lip from the side wall from which the lip projects.

7. The kit as claimed in claim 6, wherein the second portion of each lip projects simultaneously downwardly and inwardly away from the first portion.

8. The method as claimed in claim 7, wherein the second portion projects inwardly from the first portion to define a lateral distance between each lip and the sidewall from which such lip projects, wherein the lateral distance widens in a direction towards a maximum extension of such lip from the corresponding sidewall.

9. A method of forming a raceway assembly comprising:
providing a plurality of members defining a plurality of portions including channel portions and a coupling portion, each of the portions extending in an axial direction and having a plurality of walls defining a generally U-shaped cross-section, each said coupling portion having a bottom wall and first and second opposing sidewalls extending upwardly from the bottom wall and each said channel portion having a base wall and a pair of lateral sidewalls extending upwardly from the base wall, the bottom wall of each said coupling portion having a plurality of holes at first intervals extending along a line in the axial direction, and the base wall of each said channel portion having a plurality of corresponding openings at the first intervals extending along a corresponding line in the axial direction, the members including at least one hinge member, the hinge member including first and second portions and a hinge, the hinge connecting the first and second portions;

receiving one or more of the channel portions by the coupling portion so that an axial direction of each received channel portion is aligned with the axial direction of the coupling portion and so that a plurality of the openings of each received channel portion is aligned with a plurality of the holes, the coupling portion and each received channel portion having inter-engageable features which preclude movement of the received channel portion relative to the coupling portion other than in the axial directions thereof, the inter-engageable features comprising first and second lips formed integrally with the first and second sidewalls, respectively, each lip projecting inwardly from such side wall and downwardly toward the bottom of the coupling portion, so that edges of the first and second lateral sidewalls of each received channel portion are engaged between the first and second sidewalls of the coupling portion and the lips projecting from such sidewalls, such that each lip projects downwardly beyond the edge of the lateral sidewall of the received channel portion engaged by such lip; and passing a plurality of non-threaded pins through the aligned holes and openings to lock each of at least one received channel portion in place with the coupling portion, each in having a plunger slidably disposed within a bore of the pin, such that each in passes through the opening in the wall of the channel portion and the hole in the wall of the coupling portion when the plunger is in its inward position, and locks the at least one received channel portion in place with the coupling portion when the plunger is in its outward position.

10. A method as claimed in claim 9, wherein the members include at least one curved member curved in a direction transverse to the axial direction of the portion defined by the curved member.

11. A method as claimed in claim 9, wherein the first and second portions of the hinge member are coupling portions.

12. A method as claimed in claim 9, wherein each of the pins includes:
a body having a head;
wherein the bore intersects the body; and
the plunger is configured to oscillate between the inward position wherein the plunger is contained within the surface of the body and the outward position wherein the plunger extends beyond the surface of the body.

13. A method as claimed in claim 9, further comprising using a bracket to attach one or more of the members to a structure.

14. The method as claimed in claim 9, wherein each lip has a first portion projecting inwardly from one of the first and second side walls of the coupling portion towards the one of the first and second side walls opposite thereto, and a second portion projecting away from the first portion at a location spaced from the one of the first and second side walls, the second portion projecting downwardly and inwardly away from the first portion.

15. The method as claimed in claim 14, wherein the second portion of each lip projects simultaneously downwardly and inwardly away from the first portion.

16. A kit for forming a raceway assembly comprising:
a plurality of members defining a plurality of portions including channel portions and coupling portions, each of the portions extending in an axial direction and having a plurality of walls defining a generally U-shaped cross-section, each said coupling portion having a bottom wall and first and second opposing sidewalls extending upwardly from the bottom wall and each said channel portion having a base wall and a pair of lateral sidewalls extending upwardly from the base wall, the bottom wall of each said coupling portion having a plurality of holes at intervals extending in the axial direction and the base wall of each said channel portion having a plurality of corresponding openings at intervals extending in the axial direction, wherein each said coupling portion is adapted to receive one or more of the channel portions so that axial directions of the received channel portions are aligned with the axial direction of the coupling portion and so that at least one of the openings of each received channel portion is aligned with at least one of the holes, the coupling portions and channel portions having inter-engageable features which preclude movement of the received channel portions relative to the coupling portion other than in the axial directions thereof, the inter-engageable features comprising first and second lips formed integrally with the first and second sidewalls, respectively, each lip projecting inwardly from such side wall and downwardly toward the bottom of the coupling portion, so that edges of the first and second lateral sidewalls of each received channel portion are engaged between the first and second sidewalls of the coupling portion and the lips projecting from such sidewalls such that each lip projects downwardly beyond the edge of the lateral sidewall of the received channel portion engaged by such lip, the members including at least one hinge member, the hinge member including first and second portions and a hinge, the hinge connecting the first and second portions; and one or more non-threaded pins configured to pass through the aligned holes and openings and lock in place,
wherein each of the pins includes:
a body having a head;
a bore intersecting the body; and
a plunger, each plunger slidably disposed within the bore and configured to oscillate between an inward position wherein the plunger is contained within the surface of the body and an outward position wherein the plunger extends beyond the surface of the body,
wherein when the plunger is in its inward position the pin can pass through the opening in the wall of the channel portion and the hole in the wall of the coupling portion, and the pin is locked in place when the plunger is in its outward position.

17. The kit as claimed in claim 16, wherein each lip has a first portion projecting inwardly from one of the first and second side walls of the coupling portion towards the one of the first and second side walls opposite thereto, and a second portion projecting away from the first portion at a location spaced from the one of the first and second side walls, the second portion projecting downwardly and inwardly away from the first portion to define a lateral distance between each lip and the sidewall from which such lip projects, wherein the lateral distance widens in a direction towards a maximum extension of such lip from the side wall from which the lip projects.

* * * * *